(12) United States Patent
Bogusz et al.

(10) Patent No.: US 10,120,780 B2
(45) Date of Patent: Nov. 6, 2018

(54) METHOD FOR LOADING A NATIVE CODE ON A SECURE ELEMENT

(71) Applicant: GEMALTO SA, Meudon (FR)

(72) Inventors: Francois Bogusz, Meudon (FR); Francois Millet, Meudon (FR); Julien Glousieau, Meudon (FR); Abdellah El Marouani, Meudon (FR); Andre Sintzoff, Meudon (FR); Ilyas Landikov, Meudon (FR)

(73) Assignee: GEMALTO SA, Meudon (FR)

( * ) Notice: Subject to any disclaimer, the term of this patent is extended or adjusted under 35 U.S.C. 154(b) by 8 days.

(21) Appl. No.: 15/100,313

(22) PCT Filed: Sep. 26, 2014

(86) PCT No.: PCT/EP2014/070693
§ 371 (c)(1),
(2) Date: May 29, 2016

(87) PCT Pub. No.: WO2015/078614
PCT Pub. Date: Jun. 4, 2015

(65) Prior Publication Data
US 2016/0299832 A1    Oct. 13, 2016

(30) Foreign Application Priority Data
Nov. 29, 2013 (EP) ..................... 13306641

(51) Int. Cl.
*G06F 9/44* (2018.01)
*G06F 11/36* (2006.01)
*G06F 21/57* (2013.01)
*G06F 8/41* (2018.01)
*G06F 8/65* (2018.01)
*G06F 9/455* (2018.01)

(52) U.S. Cl.
CPC .......... *G06F 11/3624* (2013.01); *G06F 8/447* (2013.01); *G06F 8/65* (2013.01); *G06F 9/45504* (2013.01); *G06F 21/572* (2013.01)

(58) Field of Classification Search
None
See application file for complete search history.

(56) References Cited

U.S. PATENT DOCUMENTS 6,295,638 B1 * 9/2001 Brown ................ G06F 9/44557
717/148

FOREIGN PATENT DOCUMENTS

GB      2466220 A    6/2010

OTHER PUBLICATIONS

Anonymous: "Java Card 2.1.1 Virtual Machine specification", 20000518, May 18, 2000, pp. i-v, 1, XP002208585, p. 2-p. 4, p. 66, figures 1-2.
(Continued)

*Primary Examiner* — Qamrun Nahar
(74) *Attorney, Agent, or Firm* — The Jansson Firm; Pehr B. Jansson

(57) ABSTRACT

The invention relates to a method for loading at least one native code on at least one target secure element comprising a java card virtual machine, said method comprising the following steps: providing a modified CAP file composed of at least one custom CAP component comprising a native code; extracting said native code from the custom CAP component; installing said native code in the target secure.

20 Claims, 2 Drawing Sheets

(56) References Cited

OTHER PUBLICATIONS

PCT/EP2014/070693 International Search Report, dated Oct. 14, 2014, European Patent Office, P.B. 5818 Patentlaan 2, NL—2280 HV Rijswijk. , pp. 1-11. QN.
PCT/EP2014/070693 Written Opinion of the International Searching Authority, dated Oct. 14, 2014, European Patent Office, P.B. 5818 Patentlaan 2, NL—2280 HV Rijswijk—Pays Bas. , pp. 1-6. QN.

\* cited by examiner

METHOD FOR LOADING A NATIVE CODE ON A SECURE ELEMENT

FIELD OF THE INVENTION

The present invention relates generally to a method for fixing bugs on a secure element and more specifically a method for fixing bugs in native code of a javacard based smart card.

BACKGROUND OF THE INVENTION

Java Card is a well known technology which provides a secure environment for software Java based applications also called "applets" to be run on a secure element. Such secure elements, compliant with Java Card Standard, may sometimes face software bugs when they are already issued and on the field.

The bugs may be located in the Java Code or in the native code. When in the java code, the bugs may be fixed by loading a java patch on the secure element. This solution is already known and accepted by certification authorities. A secured load post-issuance for embedded code and Java Card content and linking is described in standards such as GlobalPlatform and JavaCard for example in Cap File format on Java Card, Loading command on GP.

When in the native code, a solution may consist in implementing a specific proprietary loader inside the secure element, with its dedicated security verifications.

However such solution would require to be reviewed by security labs on the deployment method and on the code content in order to avoid attacks on the native code fix, either when the fix code is loaded by a non authorized party, or when a malicious code is injected inside load blocks during the loading process by an authorized party. Moreover the implementation of a specific proprietary loader itself may be costly in term of memory space in the secure element, and could provide some security holes.

It is then an object of the invention to provide a method for securely loading a native code on secure element post issuance, for correcting one or several bugs of the native code once the secure element is issued on the field.

Thereto, the present invention provides a method for loading at least one native code on at least one target secure element, said method comprising the following steps:
providing a modified CAP file composed of at least one custom CAP component comprising a native code;
extracting said native code from the custom CAP component;
installing said native code in the target secure element.

Thanks to the method, bugs located in the native code may be corrected easily in post-issuance.

According to another aspect of the invention, the method may comprise embedding a platform's signature as a dedicated Java Card custom CAP component into said at least CAP file or into the at least one custom CAP component.

According to another aspect of the invention, the at least one custom CAP component may comprise a custom header component parameter, a header and the native code.

According to another aspect of the invention, the custom CAP component header may comprise information on the size, the type and number of corrections or of new elements or of functions to be added.

According to another aspect of the invention, the header information may comprise information on the section or sub-section where the correction(s) or added function(s) have to be done, and the size of said compiled corrections or added elements or functions.

According to another aspect of the invention, the method may comprise determining whether the at least one custom CAP component is sent by an authorised party by comparing a platform's component embedded in the custom CAP component with a signature embedded in the target secure element, the party being considered as authorized if the two signatures are identical.

According to another aspect of the invention, the method may comprise aborting the loading process if the Operating System of the target secure element determines the at least modified CAP file comprising the custom CAP component is not sent by an authorized party.

According to another aspect of the invention, the method comprises grouping a set of native codes as one or more custom CAP components into one single or several modified CAP files in order to load said set of native codes into a set of secure elements, each native code embedding a platform's signature.

According to another aspect of the invention, the step of compatibility signature may comprise comparing the platform's signature embedded the one or more custom CAP components and the platform's signature of each secure element of said set of secure elements.

According to another aspect of the invention, the method may comprise deploying the one or several modified CAP file post issuance remotely.

According to another aspect of the invention, the method may use an IJC file instead of a CAP file.

The present invention also provides a method for generating a modified CAP file comprising at least a native code to be loaded on at least a target secure element comprising a Java Card Virtual Machine, said method comprising the following steps: generating a native code to be executed by the target secure element; generating a first CAP file comprising a set of CAP components; generating a modified CAP file by adding to the first CAP file a custom CAP component comprising the generated native code.

Thanks to the invention, the loading deployment method of the new native code is secure. The native code fix is integrated using custom Java card component. It facilitates the deployment on server side for example on a Trusted Server Manager, using the current loading method in term of content and security.

The secure element verifies the compatibility signature from the native component with its own build signature.

BRIEF DESCRIPTION OF THE DRAWINGS

The various aspects, features and advantages of the invention will become more fully apparent to those having ordinary skill in the art upon careful consideration of the following Detailed Description, given by way of example thereof, with the accompanying drawings described below.

DETAILED DESCRIPTION

The present invention may be understood according to the detailed description provided herein.

The present invention proposes a method for loading at least a native code into at least a secure element. The method therefore comprises loading one or more native codes into one secure element or loading one or more native codes into a set of secure elements.

Figure 1:
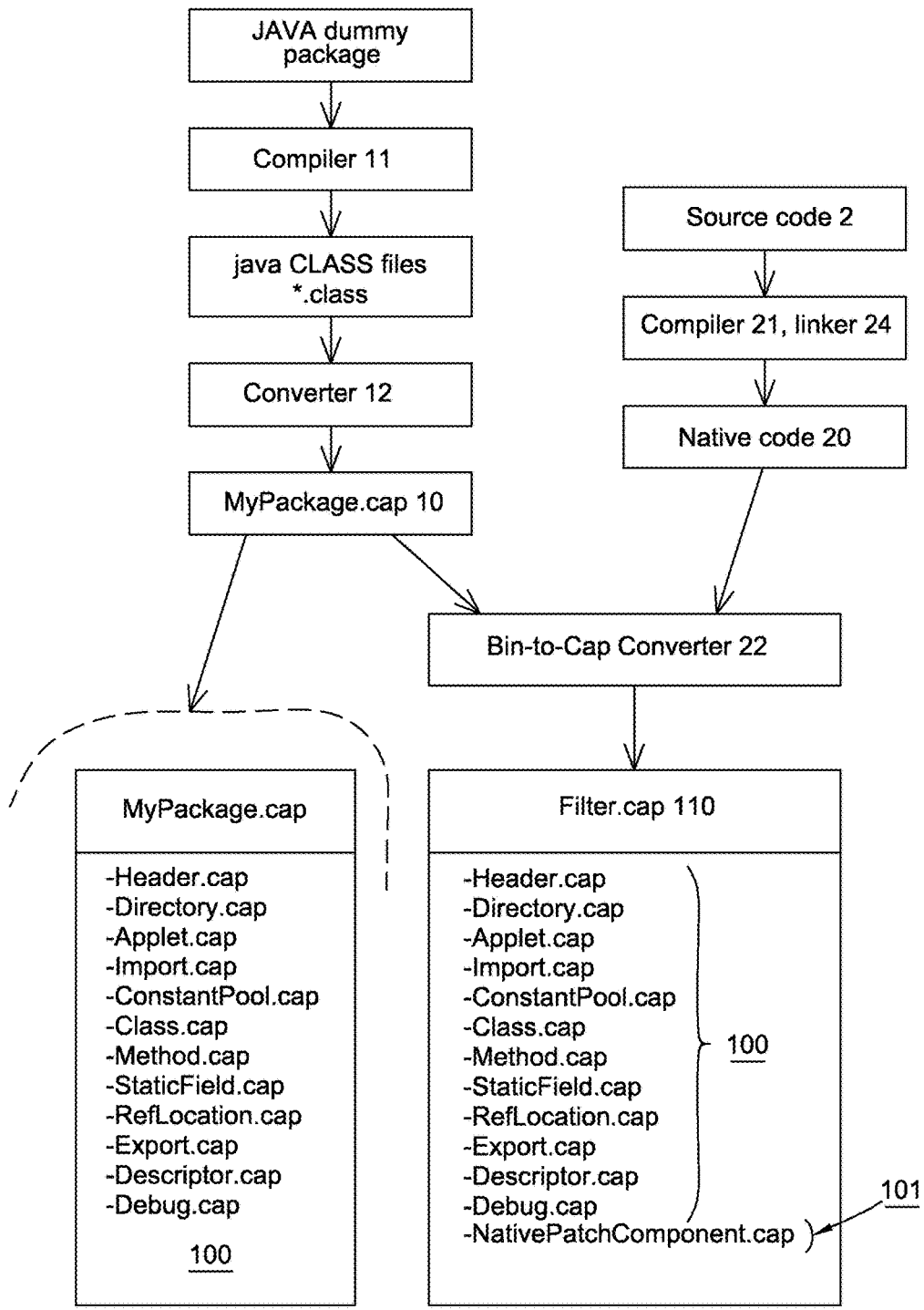
FIG. 1 provides a method according to the invention for loading a native code on a target secure element.

FIG. 1 provides a method according to the invention for loading a native code on a target secure element. The secure element can be for example a Java smart card, comprising a central processing unit (CPU) and storage means.

The method according to the present invention comprises generating a first Java Card CAP (Converted packages) file 10, also called hereinafter CAP file so that the native code is available for use through a Java Card application on said secure element once loaded.

The first CAP file 10 is in a standard format and comprises a set of components 100 wherein each CAP file component is represented as a single file as defined in JavaCard standard. As known it contains a binary representation of a package of classes that can be installed on the secure element and for example used to execute package's classes on a Java Card virtual machine (not represented) of the secure element 1: it consists first in writing a Java source code (example: *.java), then compiling the source code into Java class files (example: *.class) through a compiler 11, and converting the class files through a converter 12 into the CAP file format 10 (example: *.cap).

The method comprises a step of building a native code 20 from the source code 2 through a compiler 21 and a linker 24. The generated native code 20 is in machine language specific to the CPU of the secure element 1. It is compatible with a target secure element so that it can be interpreted by the CPU of the secure element itself.

The method then comprises generating a modified CAP file by adding at least a custom component 101 to the first CAP file 10, also called native custom CAP component 101. The native code 20 is added as a Java Card custom component into the first CAP file 10 by a converter 22 providing a modified CAP file. Thus the modified CAP file 110 comprises the set of components 100 and at least one custom CAP component 101.

Figure 2:
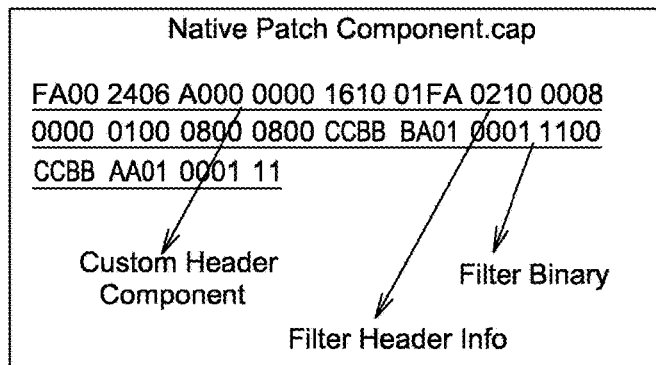
FIG. 2 schematically shows a schematic illustration of a structure of a CAP file according to the invention.

According to an embodiment as shown in FIG. 2, the custom CAP component 101 comprises a custom header component, a header information, the native code 20 and a platform's signature, wherein the platform of the secure element 1 is a combination of both the secure element's hardware and the OS of the secure element.

The custom CAP component header comprises information on the size, the type and number of corrections or of new elements or of functions to be added.

The header information comprises for example information on the section or sub-section where the correction(s) or added function(s) have to be done, and the size of said compiled corrections or added elements or functions.

When receiving the modified CAP file, it is determined whether the native custom CAP component 101 is sent from an authorised party. An identifier of the custom CAP component 101 predetermined in the OS of the secure element allows to recognize the custom component 101 among all of the CAP components 100,101 carried by the modified CAP file. During the loading process, when the modified CAP file 110 is received by the secure element and when the custom CAP component 101 is detected by the OS, it can be further checked whether the CAP file 10 is sent by an authorized party. The OS of the secure element checks a compatibility signature, i.e, compares the platform's signature embedded in the custom CAP component 101 and the platform's signature of the secure element.

This compatibility check allows the OS to determine whether the modified CAP file 110 comprising the custom CAP component 101 is sent from an authorised third party.

If the OS determines that the modified CAP file 110 comprising the custom component 101 is not sent by an authorised party, then the method comprises aborting the loading process.

Otherwise, the OS is able to load the custom CAP component 101 with the native code 20 and to proceed to the update of the corresponding information according to the content of the custom CAP component 101.

Thanks to this method, the native code 20 is injected inside the CAP file 10 as a custom component 101, and the native code can then be loaded as a classic Javacard application.

The method advantageously provides a post issuance bug correction.

The method may advantageously also be used for adding a feature into the existing OS, wherein part of the feature code is in a native code loaded through a CAP file component. The execution process of the feature is then faster.

According to another embodiment, the compatibility signature is embedded as a dedicated Java Card custom component (not represented) into the modified CAP file 110 or is comprised in the custom CAP component header.

Figure 3:
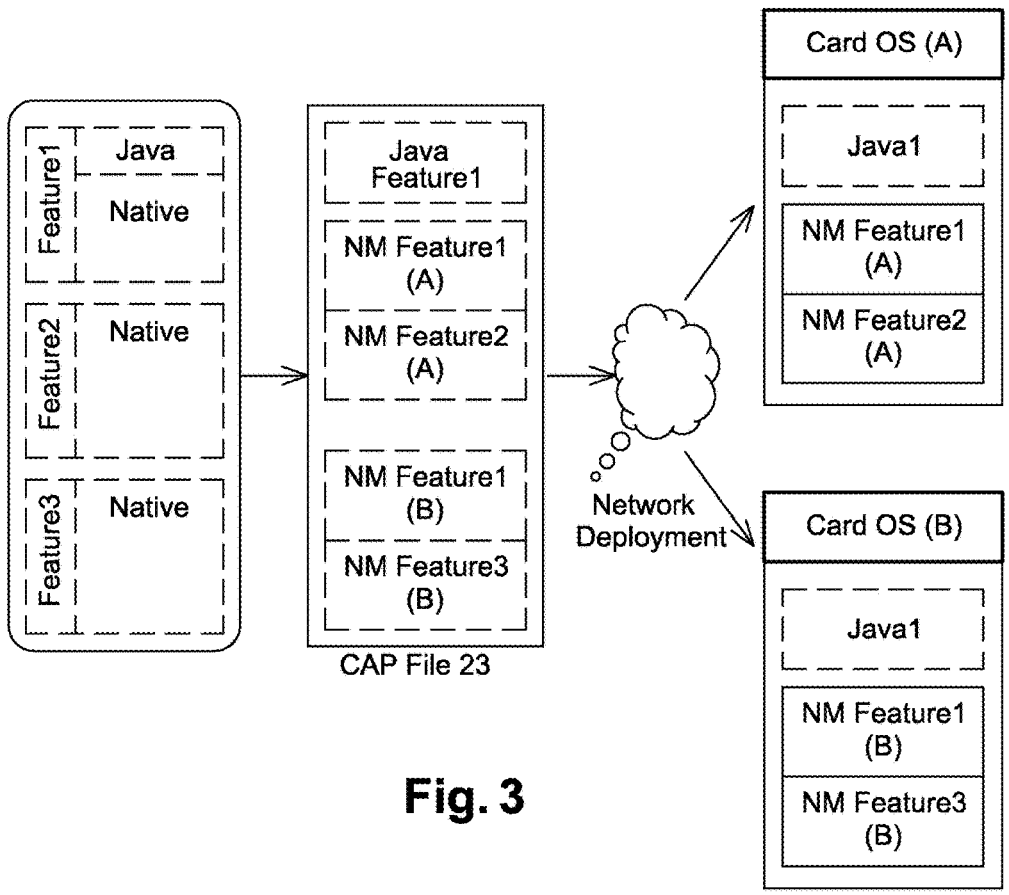
FIG. 3 schematically shows a embodiment of the present invention wherein the method is used to load a multiple native codes into one single CAP file for a deployment in a set of secure elements.

In another embodiment as shown in FIG. 3, the method comprises generating and loading multiple native codes post issuance OTA (Over-The-Air) in a set of secure elements.

New features F1, F2 and F3 are deployed on two secure elements 3, 4 that have different operating systems OS A, OS B. the feature 1 comprises a Java code and a native code, both features F2 and F3 comprises native codes. The secure element 3 with the OS A has to be updated by loading new features F1 and F2. The secure element 4 with a different OS B has to be updated by loading new features F1 and F3.

Each native code to be loaded is generated during the platform build and embeds a platform's signature.

Once the common Java code and the specific native codes of the features F1, F2, F3 are generated, the method comprises embedding the set of native codes into a CAP file 23 as one or more custom components as described above.

Once the CAP file 23 is created, the method comprises deploying the CAP file 23 post issuance remotely, for example OTA, via Internet, contactlessly.

When loading the native codes through one or several custom components, the method comprises a step of checking the compatibility of the native codes to be loaded with each secure element 3, 4, i.e comparing each platform's signature as embedded into the one or several custom component(s) with the platforms' signatures of the secure elements 3, 4 on which the native codes are supposed to be loaded.

If the comparison is successful, the targeted platform loads all compatible native codes blocks present in the CAP file 23. The OS A of the secure element 3 then loads binary codes corresponding to the features 1 and 2, and the the OS B of the secure element 4 loads binary codes corresponding to the features 1 and 3.

It will be well understood, that the binary codes of the native codes and the platforms' signatures can be grouped either in one custom component, or can be separated in several custom components. For example, one custom component can comprise the binary native code blocks for different platforms and another custom component can comprise the corresponding signatures. Or one custom component can comprise both binary code blocks and corresponding signatures.

As represented on FIG. 3, the secure element 3 with the OS A loads the new feature F1, i.e loads the Javacard code Java1 and the binary code generated from the native code of the feature F1. It also loads the feature 2, i.e the binary code generated from the native code of the feature F2. The secure element 4 with the OS B loads the new feature 1 comprising the Javacard code Java1 and the binary code generated from the native code of the feature 1. It also loads the new feature 3 comprising the binary code generated from the native code of the feature 3.

The deployment process is then improved by grouping multiple native modules NM or native codes as native custom components into one single or several CAP file.

In another embodiment, the method comprises using a subset of the CAP file 10,23, for example an IJC file, for loading the native code 2 instead of the the CAP file 10, 23. As known a IJC file is a CAP file wherein unnecessary components have been removed in order to reduce bandwidth during transmission.

Thanks to this method, multiple features whatever incompatible or compatible may be added into one single CAP or IJC file. The deployment of features is less complex when a server addresses a highly heterogeneous and big secure element's park and more efficient by managing the different platforms' binary code incompatibilities.

Moreover on database server, the features are more cautiously managed according to the targeted platforms.

Reliability, performance, and bandwidth are for example improved thanks to this method during a remote update (OTA, Internet, . . . ) on post issuance.

It will be well understood that those examples are not limited examples. This method is also suitable for being used post-issuance not remotely, for example at a point of sale, or may even be used pre-issuance in a factory.

Thanks to this method, the deployment efficiency of features or bug correction containing native code is improved and ased by grouping them into one single deployment file (CAP, IJC).

The invention claimed is:

1. A method for correcting at least one bug located in native code of at least one target secure element by loading at least one native code correction, added element, or added function on the at least one target secure element comprising a java card virtual machine and native code, said method comprising the following steps:
providing a modified CAP file composed of at least one custom CAP component comprising a native code correction, added element, or added function to the native code of the at least one target secure element, the CAP component comprises information on the size, the type and number of corrections, or of new elements or of functions to be added;
extracting said native code correction, added element, or added function from the custom CAP component;
installing said native code correction, added element, or added function in the native code of the target secure element.

2. The method according to claim 1, further comprising embedding a signature of a platform as a dedicated Java Card custom CAP component into the native code correction, added element, or added function of said at least one modified CAP file or into the native code correction, added element, or added function at least one custom CAP component.

3. The method according to claim 1, wherein said at least one custom CAP component comprises a custom header component parameter, a header and the native code.

4. The method according to claim 1 wherein the header information comprises information on the section or subsection where the correction(s) or added function(s) have to be done, and the size of said compiled corrections or added elements or functions.

5. The method according to claim 1 further comprising determining whether the at least custom CAP component is sent by an authorised party by comparing a platform's component embedded in the custom CAP component with a signature embedded in the target secure element, the party being considered as authorized if the two signatures are identical.

6. The method according to claim 5, further comprising aborting the loading process if the Operating System of the target secure element determines that the modified CAP file comprising the custom CAP component is not sent by an authorized party.

7. The method according to claim 1, further comprising: grouping a set of native codes as one or more custom CAP components into one single or several modified CAP files in order to load said set of native codes into a set of secure elements, each native code embedding a platform's signature.

8. The method according to claim 7, wherein the step of compatibility signature comprises comparing the platform's signature embedded the one or more custom CAP components and the platform's signature of each secure element of said set of secure elements.

9. The method according to claim 1, further comprising deploying the one or several modified CAP file post issuance remotely.

10. The method according to claim 1, wherein an IJC file is used instead of a CAP file.

11. A method for generating a modified CAP file to correct at least one bug located in native code on at least one target secure element, the method comprising at least a native code correction to be loaded on the at least one target secure element comprising a Java Card Virtual Machine and native code, the native code correction being a correction to the native code of the at least one target secure element, said method comprising the following steps:
generating a native code correction to be loaded into the native code of the target secure element and executed by the target secure element;
generating a first CAP file comprising a set of CAP components, wherein each CAP component comprises information on the size, the type and number of corrections, or of new elements or of functions to be added;
generating a modified CAP file by adding to the first CAP file a custom CAP component comprising the generated native code correction; providing the modified CAP file to the native code of the at least one target secure element;
extracting the native code correction from the custom CAP component; and
installing the native code correction in the native code of the target secure element.

12. The method according to claim 2, wherein said at least one custom CAP component comprises embedding a signature of a platform as a dedicated Java Card custom CAP component into the native code correction, added element, or added function of said at least one modified CAP file or into the native code correction, added element, or added function at least one custom CAP component.

13. The method according to claim 2 wherein said at least one custom CAP component comprises a custom CAP component header comprising information on the size, the type and number of corrections or of new elements or of functions to be added.

14. The method according to claim 2 wherein the header information comprises information on the section or subsection where the correction(s) or added function(s) have to be done, and the size of said compiled corrections or added elements or functions.

15. The method according to claim 2 further comprising determining whether the at least custom CAP component is sent by an authorised party by comparing a platform's component embedded in the custom CAP component with a signature embedded in the target secure element, the party being considered as authorized if the two signatures are identical.

16. The method according to claim 15, further comprising aborting the loading process if the Operating System of the target secure element determines that the modified CAP file comprising the custom CAP component is not sent by an authorized party.

17. The method according to claim 2, further comprising: grouping a set of native codes as one or more custom CAP components into one single or several modified CAP files in order to load said set of native codes into a set of secure elements, each native code embedding a platform's signature.

18. The method according to claim 17, the step of compatibility signature comprises comparing the platform's signature embedded the one or more custom CAP components and the platform's signature of each secure element of said set of secure elements.

19. The method according to claim 1, further comprising deploying the one or several modified CAP file post issuance remotely.

20. The method according to claim 1, wherein the custom CAP component further comprises an identifier allowing the target secure element to recognize the custom CAP component from other CAP components carried by the modified CAP file.

* * * * *